(No Model.) 5 Sheets—Sheet 1.
A. S. MILES.
METHOD OF AND MEANS FOR PREPARING BRISTLES FOR BRUSH MAKING.
No. 522,609. Patented July 10, 1894.
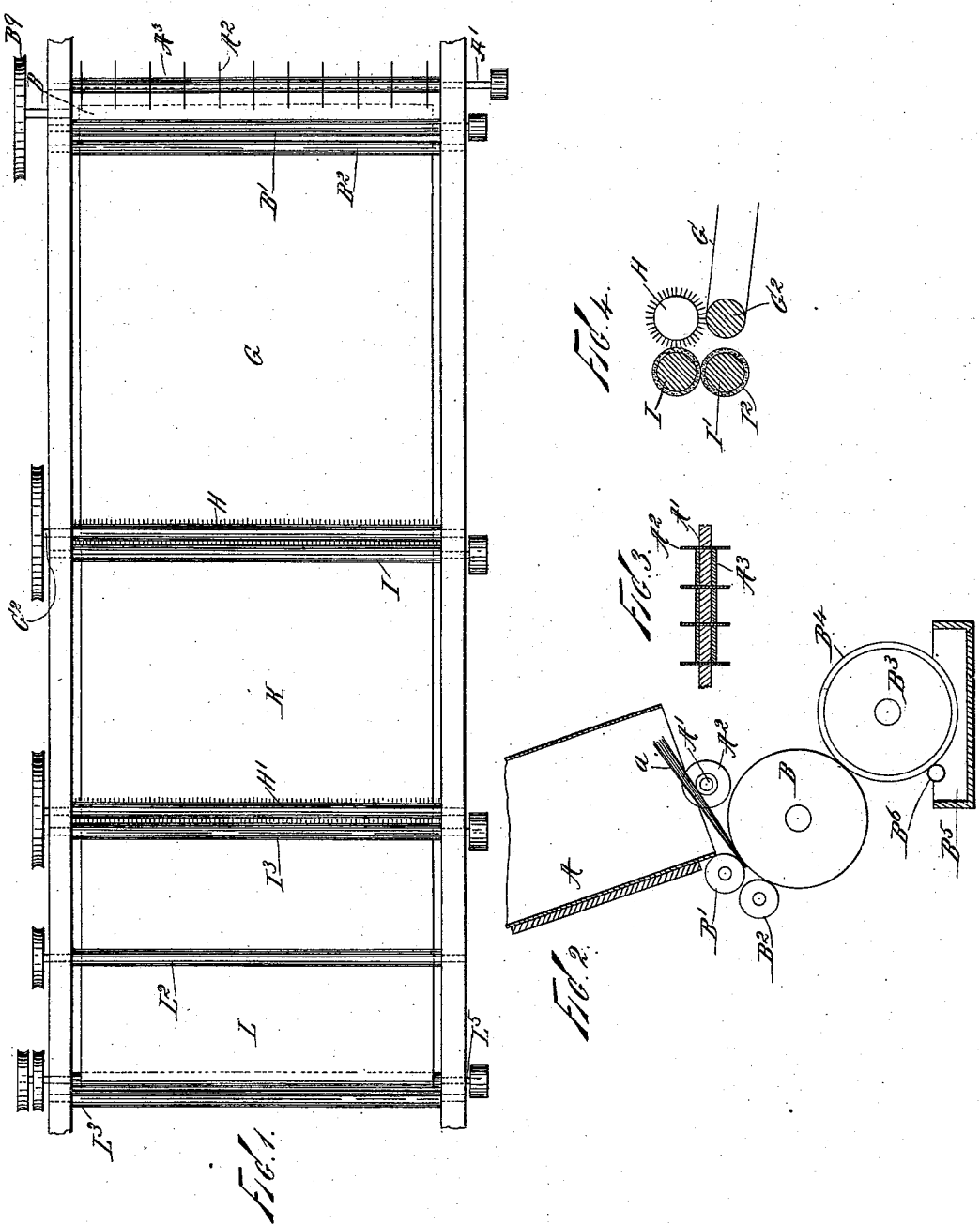
WITNESSES:
John Buckler,
L. H. Osgood
INVENTOR
Alfred S. Miles,
BY
Worth Osgood,
ATTORNEY

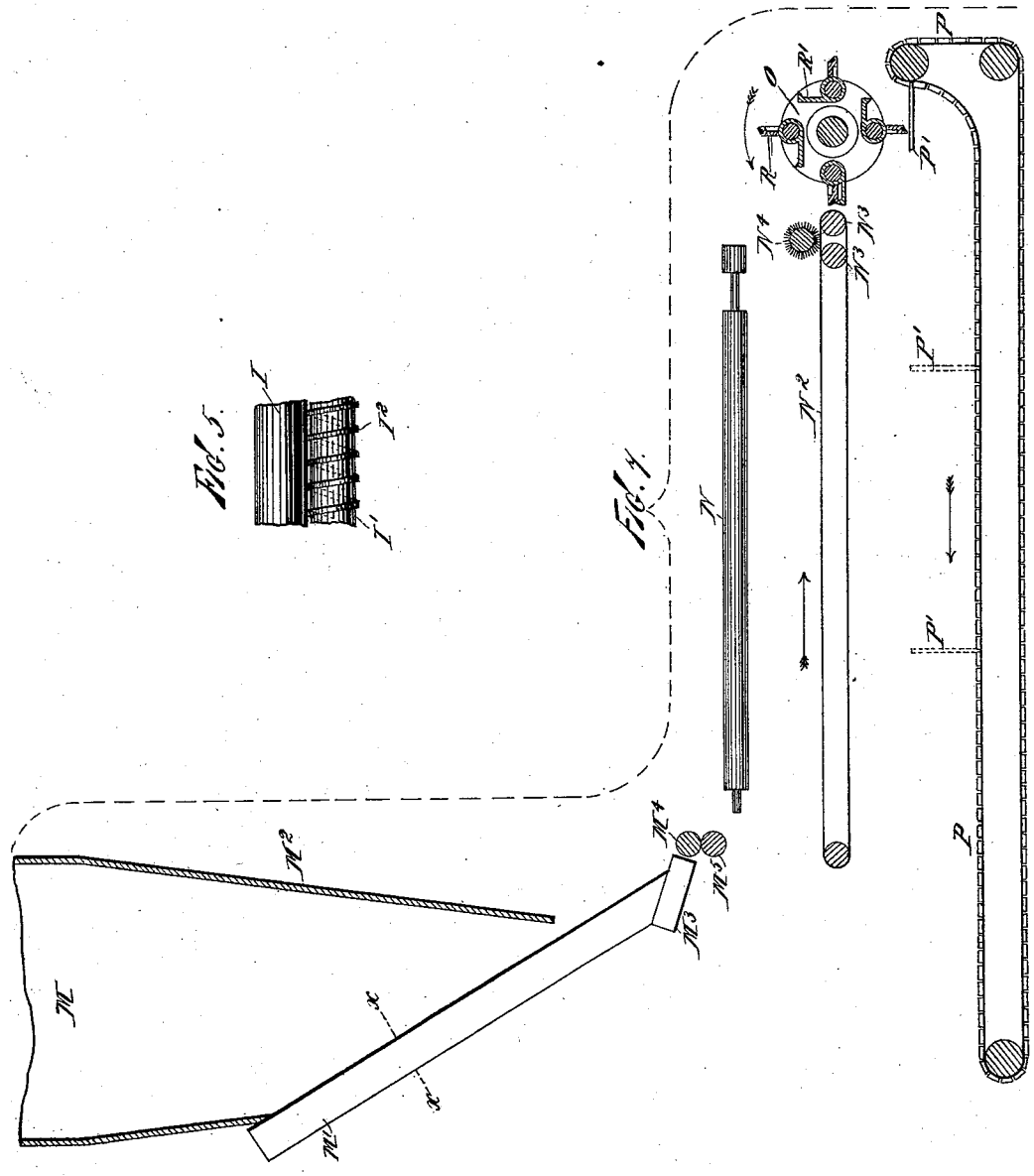

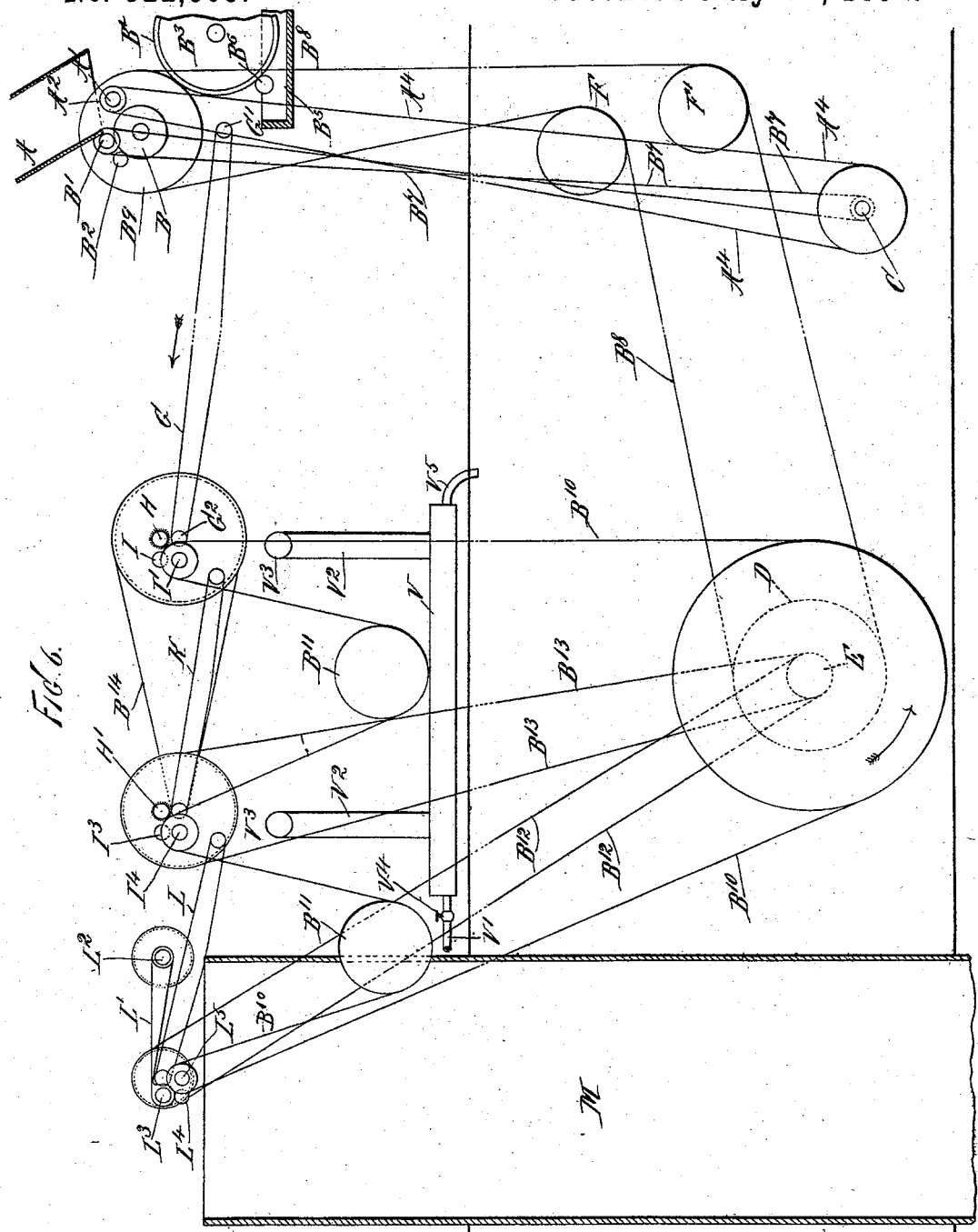

(No Model.) 5 Sheets—Sheet 4.
A. S. MILES.
METHOD OF AND MEANS FOR PREPARING BRISTLES FOR BRUSH MAKING.
No. 522,609. Patented July 10, 1894.
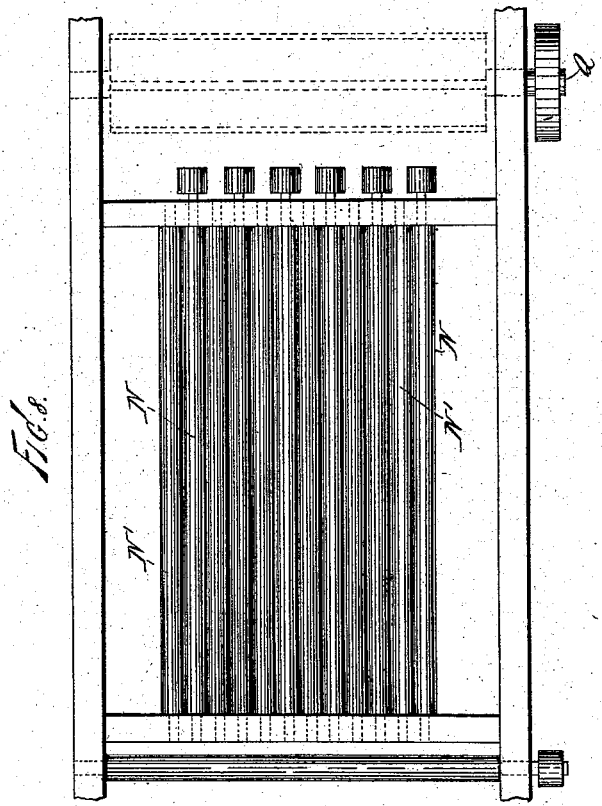

(No Model.) 5 Sheets—Sheet 5.
A. S. MILES.
METHOD OF AND MEANS FOR PREPARING BRISTLES FOR BRUSH MAKING.
No. 522,609. Patented July 10, 1894.
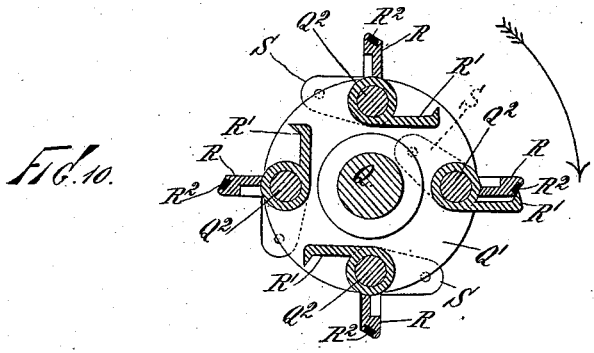
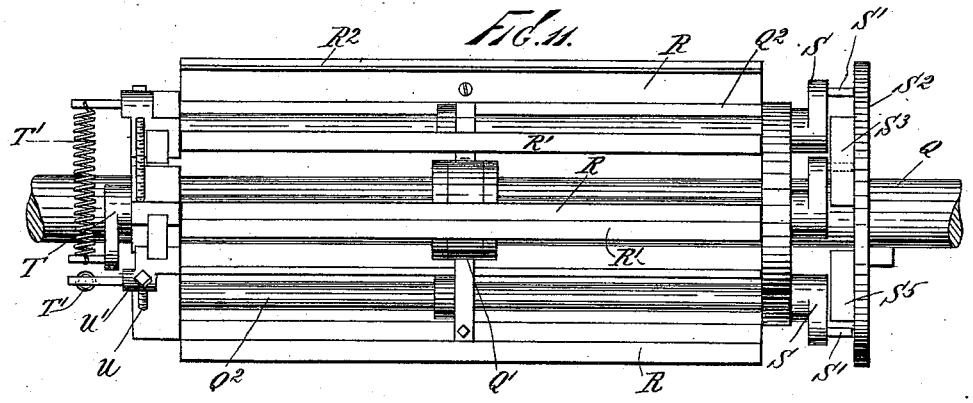
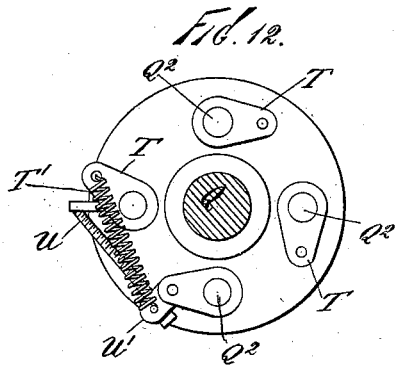 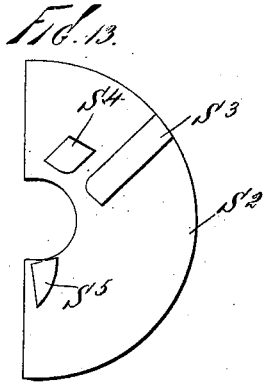
WITNESSES:
John Buckler,
L. H. Osgood
INVENTOR
Alfred S. Miles,
BY
Worth Osgood,
ATTORNEY

UNITED STATES PATENT OFFICE.

ALFRED S. MILES, OF BROOKLYN, NEW YORK.

METHOD OF AND MEANS FOR PREPARING BRISTLES FOR BRUSH-MAKING.

SPECIFICATION forming part of Letters Patent No. 522,609, dated July 10, 1894.

Application filed June 13, 1892. Serial No. 436,570. (No model.)

*To all whom it may concern:*

Be it known that I, ALFRED S. MILES, of Brooklyn, county of Kings, and State of New York, have invented certain new and useful Improvements in Methods of and Means for Preparing Bristles for Brush-Making, of which the following is a full, clear, and exact description, reference being had to the accompanying drawings, and to the letters of reference marked thereon.

My invention relates to the art of arranging bristles to prepare them for the brush maker's use and involves certain new and useful methods or processes as well as new and useful arrangements or combinations of mechanical appliances, all of which will be herein first fully described and then pointed out in the claims.

My present invention is in many respects an improvement on that shown and described in my United States Letters Patent of April 12, 1881, No. 240,036, wherein the previous state of the art was set forth in considerable detail. In the said patent the desired straightening and arranging of the bristles with their butts or root ends in one direction and their flag or soft ends in the opposite direction was accomplished by taking advantage of the fact that the center of gravity of each bristle is located considerably nearer the butt than the flag end; and in the present case this same peculiarity is relied upon, the bristles being delivered, as may be briefly said, into the open mouth of a vertical chute, allowed to drop therethrough, being free to turn therein, and being delivered from the bottom thereof roots or butt ends first.

Thus far my present and former (patented) inventions are similar and here the similarity ends, for, in respect to the method and means of delivering the bristles to the open mouth of the chute and the treatment thereof previous to such delivery, and in respect to the method and means of collecting and arranging them after discharge from the chute I have made several new and important improvements as will appear from a consideration of the following descriptions and explanations, the prominent objects of these improvements being to insure a uniform delivery of the bristles to the chute perfectly mixed as to quality, in a thoroughly sepa- rated condition so that one will not cling to or interfere with another and so that the formation of clumps or masses within the chute will not occur,—and to provide for the reception and final delivery of the bristles not only with the butts in one direction and the flag ends in the other, but also leveled up or "butted" and ready to be carried to the brush maker without the necessity of any thumping or similar subsequent process which is required in all hand operations and was required in using my previous form of apparatus.

In the accompanying drawings I have shown a machine or apparatus constructed and arranged for operation in accordance with my invention, involving my mechanical improvements and adapted to carry out my improved methods or processes, the illustrations being divided for the reason that the machine as practically constructed occupies too much space to be conveniently represented in a single figure, details of portions conventionally represented in the main figures being supplied where necessary to their complete understanding.

Figure 1 is a plan view of the upper part of the machine, showing the distributing aprons, pulleys, rolls, &c., mounted on the upper frame, omitting the hopper. Fig. 2 is a sectional elevation, on a much larger scale than Fig. 1, showing the hopper, the ejecting or projecting rolls at the mouth thereof, the dampening roll, and the straightener roll; and Fig. 3 is an axial sectional view, illustrating the construction of the straightener roll. Fig. 4 is a sectional elevation showing the construction and arrangement of the picker and projecting rolls at the delivery portion of one of the distributing aprons, and Fig. 5 is an elevation of the projecting rolls, showing the spiral winding on the lower one. Fig. 6 is a side view, showing the arrangement of hopper, rolls, belts and driving mechanism at the receiving end of the machine and in connection with the upper end of the chute, the chute being in section;—and Fig. 7 is a continuation of Fig. 6 showing in section the lower end of the chute and in elevation the bottom plate, the rolls at the mouth of the chute, the carrying apron, the gripper and the final receiving apron, the frame or the foundation of the machine being omitted in Figs. 6 and 7 as being unnecessary for the present description. Fig. 8 is a plan of the gang or table of rolls at the mouth of the chute upon which the bristles are projected. Fig. 9 is a cross sectional view on line $x$—$x$ of Fig. 7, showing the grooved or fluted construction of the bottom plate of the chute. Fig. 10 is a cross section of the gripper and Fig. 11 a front elevation thereof. Fig. 12 is a partial view in elevation of one end of the gripper, intended to demonstrate the action of the jaw springs and omitting unnecessary parts which are merely duplications of those made to appear. Fig. 13 is a face view of the cam plate and attached cam blocks by which the movements of the gripper jaws (to open and close) are started.

In all the figures like letters of reference wherever they occur indicate corresponding parts.

In the use of my previously patented machine above referred to I have discovered that in the movement of a body of bristles they become electrified and attract one another, clinging together in greater or less masses or clinging to portions of the apparatus, and this in such manner and to such extent as to prevent them being, by mechanical means, separated so as to be individually free to move alone in the machine, to turn in the chute and there follow the natural law of gravity which would cause them to reach the bottom with the heaviest end down. The result has been that the bristles were delivered in clumps and required to be worked over by hand in order to correct the difficulty—and at some stages of the atmosphere most favorable for electrification, it was practically of no advantage to use the machine, to such extent did this electrification take place. I have observed further that, even though no electrification takes place, if the bristles are delivered to the chute in an imperfectly separated condition or following too close upon each other, one will interfere with the free adjustment of the other around its center of gravity, and I therefore now prevent the electrification of the bristles from the time they are delivered from the hopper or otherwise started to move in the machine, and otherwise prevent them from following too close upon each other, and this by methods and means as will appear from the following specification.

A represents the hopper into which a mass of bristles previously cleansed and dried are delivered or placed to be automatically fed so as to be operated upon by the machine. If arranging and straightening be the only objects, the mass is first roughly bunched and laid in with the ends tending generally toward the front of the hopper but without any special care being necessary, the design of the machine being to obviate as nearly as possible all hand labor,—but if mixing be also one of the objects, then the different qualities or colors, &c., are generally first laid roughly in horizontal rows one upon the other and this pile cut down through by the workman who places the slices thus obtained horizontally in the hopper. This is merely a convenient preliminary step to mixing practiced by brush makers and need not of necessity be followed, as a rough mixing in any way will be found amply sufficient, and the hopper need not always be employed. With riflings and such like qualities of material to operate upon I generally find it about as convenient to scatter them upon the first traveling apron as it is to place them in the hopper.

In the lower mouth of the hopper is a slowly revolving roll $A'$, supplied at intervals with projecting disks $A^2$ separated by rubber or other sleeves $A^3$. The bristles rest upon this roll (some of which are indicated at $a$) and are carried forward by it until pinched by the projecting rolls B, $B'$, $B^2$ when they are advanced more rapidly, being thus dragged from between the disks $A^2$. These disks then operate to cause the bristles to be delivered from the hopper in the direction of their length, rather than sidewise, and this roll is therefore called the straightener roll.

The ejecting or projecting rolls at the delivery end of the hopper are three in number. The large roll B is covered with rubber or made of stone or some such material, so that it will carry a thin film of water and at the same time so that it will act to carry the bristles forward. It is made to revolve rather slowly. Over it and in contact with it is another roll $B'$ which pinches the bristles down upon roll B causing them to be carried forward to and beneath a third roll $B^2$ made to revolve by its contact with roll B and operating as a guide to project the bristles down upon the first apron, the effect of the difference in speed of the rolls being to separate the bristles somewhat lengthwise before they are ejected from the hopper. Cold water is supplied to roll B continuously and uniformly through the medium of a suitable appliance, as, for instance, a roll $B^3$ preferably covered with felt, flannel or some such porous absorbent material as $B^4$ so that it will conveniently take up and distribute the water which may be fed to it. In the form shown the roll $B^3$ is made to revolve in a trough or tray $B^5$ for containing water, a stripping roll as $B^6$ revolving against roll $B^3$ in order to prevent too great a quantity of water being carried up. Any other desired means of clampering the roll B may be adopted.

The roll $A'$ is driven as by a belt $A^4$ and the roll $B'$ is driven as by a belt $B^7$ both moved by a shaft C and speeded as indicated so that roll $A'$ will travel considerably faster than roll $B'$. The roll B is driven by a belt as $B^8$ for convenience located on the side of the frame opposite belts $A^4$ and $B^7$. This belt leads from a pulley D on the main shaft E around idlers F $F'$ and over pulley $B^9$ on the shaft of the roll B. It will be observed that the roll B is thus driven independently of rolls A' and B' so that its speed relative to that of the others may be varied as may be required according to circumstances.

From the hopper the bristles are projected (by the rolls above referred to) upon an endless apron G made of canvas or other suitable material and extending about the width of the machine between the frame. The speed of this first apron is a trifle greater than that of roll B' in order that as the bristles fall upon it they will be separated or distributed upon the apron more than they would otherwise be. The apron G travels upon an idle roll G' located under roll B so as to be under the discharge end of the hopper, and is moved by a roll or shaft $G^2$. Over the delivery portion of apron G is mounted a picker roll H having projecting teeth as indicated (Fig. 4) which teeth are for the purpose of entering between the bristles as they are moved up to the position of the picker, dragging and forcing the bristles to travel forward and off the apron and between the succeeding rolls prepared to receive them. Without the picker roll it has been found that the bristles would be liable to become banked up before they would enter between the next set of projecting rolls, or they would be apt to cling to the canvas and pass around with it rather than submit to being projected from it in the manner desired. When seized by the next projecting rolls, the speed of the bristles is immediately accelerated, and then they are dragged between the teeth of the picker roll which dragging tends to straighten them in their forward paths and to separate them one from the other, the picker roll acting as a comb.

In advance of the picker roll H are located two projecting rolls I I', so situated that their line of contact will be about on a level with that between the picker roll and apron in order that the bristles may be received between them. These rolls I, I', travel at a speed considerably greater than that of rolls H and $G^2$. Any bristles pinched between rolls I, I', are projected forward and are sometimes cast a considerable distance or with considerable velocity depending upon the speed of the rolls and the gravity, condition and position of the bristles received. With the increased rate of speed it will be plain that the bristles are separated more and more as they are thus far advanced. One of the projecting rolls, preferably the lower one I', is provided with a spiral winding represented at $I^2$. As the bristles reach the projecting rolls some strike the windings and are immediately cast forward and others enter the spaces between the windings and cannot be cast forward until the roll has revolved sufficiently to catch them. This infinitesimal difference in time of movement or projection is sufficient to secure the further separation of the bristles. The windings also operate in a measure to carry the bristles sidewise, to turn them if necessary so that they will be projected more nearly in the direction of their lengths, and further to prevent clumps of bristles being projected before being at least somewhat divided up. While this winding is found useful and effective in the situation named, it is not to be understood that it may not be dispensed with, for a plain roller may be used instead with results probably good enough for ordinary work. Any material for the winding may be adopted, but leather will likely be found most advantageous. From the projecting rolls I I' the bristles are cast upon a second apron K mounted and moved in a manner quite similar to apron G but at a greater speed by reason of which the bristles will be still further scattered or thinned and separated, as will be understood. At the delivery end of this apron and operating in connection therewith are a picker roll H' and projecting rolls $I^3$ $I^4$, similar to the rolls H, I and I' previously described and for like purposes. The rolls $I^3$ $I^4$ project the advancing bristles upon a third apron L traveling at a greater rate of speed than apron K and thus they reach a position over the upper mouth of the chute M well scattered and well separated.

To prevent the bristles being thrown across the chute and to direct them downwardly as they leave apron L, a short endless apron L' is mounted on rolls $L^2$ $L^3$, of which the latter, $L^3$, is so located as to carry said apron L' down and upon the vertical or return bend of apron L, as indicated in the drawings. This gives the bristles a downward inclination, after which they are received between two projecting rolls $L^4$ $L^5$ and by these projected into the upper open mouth of the chute M in a thoroughly separated condition and left entirely free to be acted upon by natural forces and resistances as they fall.

Of course the driving belts or other means of communicating movement to the aprons and rolls may be arranged in any desired way. In Fig. 6 a single belt $B^{10}$ is driven by shaft E and in turn drives the rolls I' $I^4$ $L^5$, the circles $B^{11}$ $B^{11}$ being intended to represent only idlers. This is only one convenient way of driving. The apron L is driven from shaft E as by a belt $B^{12}$ and the apron K from the same shaft as by a belt $B^{13}$ but running over a larger pulley. The apron G is driven from the shaft of the roll which carries apron K as by a belt $B^{14}$ running over a still larger pulley, from all of which it will be seen that the speed of the aprons may be easily increased in the manner desired.

The shafts of the various rolls are supplied with pulleys and may be driven by any desired arrangement not necessary to be here explained.

The projecting rolls, or one in each pair, should be covered with rubber or other yielding substance to avoid injury to the bristles.

As the bristles are thus made to travel rapidly in considerable quantities from the hopper toward the chute, being agitated in various ways and in contact with each other and with parts of the apparatus, they would, unless prevented become electrified in a manner and to an extent sufficient to preclude anything approaching an effectual separation by mechanical means;—and one of the chief purposes of my invention is to obviate this electrification. The dampening with cold water of the roll B on which the bristles are originally started to move is found to moisten and chill them just enough to reduce them to a state or condition in which they are best calculated to be benefited by the subsequent treatment. From the dampening roll B they are projected upon the first apron but not in condition to become very much electrified by the projecting movement, and upon this apron they travel quietly until they reach the point where they are to be again disturbed in position and velocity, and at this point of their travel it is desirable to again treat them. I have found that the application of too much moisture is detrimental because it temporarily destroys the elasticity of the bristles and makes them soggy or loggy when they cannot be moved and separated in the desired manner, being prone to stick together. I therefore, at the point of travel above indicated, subject the bristles to an equable quiet steaming process, just enough steam being supplied to prevent drying, to overcome any tendency to further electrification and to raise the temperature only very slightly, which I am enabled to easily do because of the previous chilling. To carry out this purpose any suitable form of steaming apparatus may be used. A convenient form is shown in the drawings wherein V represents any vessel into which live steam is carried by a pipe as at V' and in which the steam is allowed ample room for expansion so that it will issue quite slowly. This vessel is placed beneath the aprons and has branches $V^2$ $V^2$ which deliver steam from it to cross conduits $V^3$ $V^3$ arranged under the delivery portions of aprons K and G, from perforations in the tops of which conduits the steam issues in the manner desired. It operates upon the bristles as they are being projected from one apron to the next and admirably answers the objects sought to be attained. The quantity of the incoming steam should be regulated according to circumstances, and this is provided for in the particular arrangement shown by use of a valve $V^4$ in the supply pipe V'.

$V^5$ represents a drain pipe by which water of condensation may be carried off.

The steaming process frequently causes the aprons to tighten, but this is not detrimental to their operation and may be compensated in any of the many ways which will suggest themselves. The bristles passed through the machine under this process are delivered in a condition none too moist to permit them to be stacked up or immediately put to use. The initial cold dampening process, while in most cases important, is not invariably essential and might sometimes be omitted, reliance being placed wholly on the steaming process.

The chute M is of considerable length and the bottom plate M' thereof is fluted or grooved substantially as indicated in Fig. 9. The bristles strike upon this plate, butt ends first, and are projected down to the delivery end. The guard $M^2$ extends down nearly to plate M' and is for the purpose of preventing upward currents of air through the chute which would interfere with the proper movements of the bristles therein. The guard is slightly inclined toward the axis of the chute so that any bristles which strike upon it will be deflected upon the bottom plate and follow down with those in the grooves maintaining the same direction, butt ends first. At the lower extremity of the bottom plate the general direction of the currents of bristles is changed so as to make them move more nearly horizontally by the application of an extension $M^3$ which might be made a part of the bottom plate. The bristles leaving this extension are received between a pair of rapidly revolving rolls $M^4$ $M^5$ by which they are ejected or projected in the direction of their lengths and always butts first, some being thrown a greater distance than others according to their weight and other conditions. To receive all the bristles thus projected I provide a table or bed of ample length and width composed of a number of rolls represented at N N', their axes corresponding in direction with the paths of the projected bristles and the bed being located close enough to these paths so that the bristles will be received upon it before they can make any considerable change of direction. The rolls N N' are driven in pairs, suitable pulleys being applied to one roll as N of each pair, and they are driven rapidly enough to carry away the bristles as fast as they are received upon the bed. The first roll N causes its mate N' to revolve in the opposite direction, the bristles being carried down between the two. Of this pair, the roll N' revolves in contact with the pulley roll N of the next pair, and so on throughout the bed, the effect of the arrangement being that any bristles falling between the pairs will be carried up and around the rolls to be afterward passed down when they reach the space between two rolls of a pair. From between the paired rolls in the bed the bristles are delivered lengthwise on an endless apron $N^2$ traveling only moderately fast, by which apron they are carried forward in the direction toward which the butts are pointing. On this apron the bristles overlap each other, and while they are received by it in a straightened and arranged condition, they have yet to be evened up or leveled or "butted" to bring the butts in the same plane before they can be graded as to length or be passed to the brush maker. The forward portion of apron $N^2$ is carried over a pair of rolls $N^3$ $N^3$ so as to afford a broad surface on which the picker roll $N^4$ can operate.

This last named roll forces the bristles as they reach it, forward so that their ends project beyond the path of the apron. Here they are seized by the gripping and delivering device, represented at O. Fig. 7, the construction and operation of which device will be explained hereinafter.

The gripper is revolved more rapidly than the picker roll $N^4$, and has sets of jaws, each set calculated to close upon the butts of all the bristles which are projecting from apron $N^2$ when the set reaches the proper point in its revolution, and thus the bristles are taken away from apron $N^2$ in lines or rows as soon as they are brought far enough forward, the gripper being made to revolve fast enough for this purpose. The jaws carry the row of bristles around to the point of delivery when they open and deposit the bristles, proceeding then around to grasp another row. In each row so grasped, the butts are in line. To collect the rows as they are deposited I employ an endless apron P made up of slats so that it can be guided in a path substantially as indicated in Fig. 7. This apron is provided with a projecting piece P' which travels with it, and upon this the bristles are first deposited by the gripper mechanism. As the apron P travels slowly in the direction of the arrow, the piece P' after having been placed in the position shown in full lines in Fig. 7, gradually assumes an upright position, as indicated by the dotted lines, and the bristles upon it assume a like position, the butts resting upon the apron. As many pieces like P' as are desired may be used. The speed of the apron P is timed so that it will carry the bristles along about as fast as received; and as the apron becomes loaded more and more the bristles already deposited afford the horizontal support for receiving the succeeding rows as they leave the gripper. By this means the bristles are leveled up, and they may be taken from the forward end of the standing mass as may be desired. The apron P may be calculated to hold any required quantity; but when the piece P' reaches the return bend of the apron, the bristles, or some of them, should of course be removed and the apron readjusted to start again.

Q is the main shaft of the gripper upon which are secured collars as Q' carrying turning or hinge rods $Q^2$ $Q^2$ which serve as supports for the movable jaws.

R R are the stationary jaws (i.e. stationary with respect to rods $Q^2$ but revolving with them around the main shaft Q being sustained by the collar Q'), and R' R' are the hinged jaws capable of movement with the turning rods being secured thereon.

The jaws R R are supplied with rubber or other suitable cushions $R^2$ $R^2$ against which the edges of the hinged jaws press the ends of the bristles,—this to avoid undue shock or jar as the hinged jaws snap to place, and also to avoid damaging the ends of the bristles. The jaws are of length sufficient to reach across the width of the apron $N^2$, usually longer than would appear from the proportions of Fig. 11 which is shortened for convenience of illustration.

As many collars Q' as may be found necessary may be supplied.

S. S. are cranks applied on the ends of the hinge rods $Q^2$ $Q^2$ on one end of the gripper, and these cranks have projecting pins S' S' by which their directions of movement and therefore those of the attached jaws R' R' are regulated. In Fig. 10 the hinged jaw at the right is shown as closed against its mate, the corresponding crank S having been carried toward the axis of the main shaft Q farther than the remaining cranks S as indicated by the dotted lines, the other hinged jaws being shown in opened position. The gripper revolves in the direction of the arrow, Fig. 10, and as each set of jaws reaches the horizontal position as at the right of the figure, the jaws are closed together, to be opened (in order to release the line of bristles) when the set reaches the position at the bottom.

To start the hinge rods at the proper time, I supply a stationary cam plate $S^2$. This is provided with two blocks $S^3$ $S^4$ against the longer one of which ($S^3$) the pins S' strike as they reach it, being then compelled to move in the radial path between the two blocks toward the axis of the main shaft Q. Thus the cranks S' and therefore the jaws connected with them are started in the proper direction for gripping the bristles at the proper points in their paths and at the proper times. Having made about a quarter of a turn with the shaft Q, the set of jaws which has been closed and which is carrying the gripped bristles must be made to open in order that they may be released, and to start them in the proper direction for this movement I mount upon the cam plate a cam block $S^5$, curved on its bearing face, against which the crank pins S' strike, and which forces them away from the axis of the main shaft Q in the direction which they must move when the hinged jaws are being opened. In the closing movement, the block $S^4$ is to prevent the pins S' from completing their inward radial travel before the corresponding jaws have reached the determined closing point in their path, as might occur (under the influence of the springs) were they not prevented.

The blocks or cams above referred to are not to be relied on to complete the opening or closing movements which would then be too gradual for any rapid and effective operation of the gripper. The closing should rather be with a snap in order that all the bristles in the line may be securely pinched and dragged forward, otherwise some would be liable to be carried only part way and they could not then be evened or leveled up by the machine; and if the opening of the jaws be only gradual the delivery would be uneven, with results of a like disadvantageous nature.

On the ends of the hinge rods $Q^2$ opposite the cranks S, I apply other cranks as T and with these connect springs as T' one end of each being anchored so as to afford the desired strain. When the crank S turns toward the shaft Q the crank T on the same hinge rod is turned from shaft Q, and as soon as the crank T is moved far enough to carry the spring beyond the line of the axis of the hinge rod the spring pulls on the crank and completes its outward movement (and therefore the closing of the hinged jaw). And, as will be readily understood, when the movement of the crank T is in the opposite direction the spring will act as soon as it is carried to the opposite side of the axis of the hinge rod. Thus it is that the springs act to complete the opening and closing movements of the jaws in the snapping manner desired.

Some of the springs are omitted from Fig. 12 to avoid confusion, and the crank T at the left of this figure is shown in the position it would assume when the corresponding jaw is opened instead of being closed, this to better indicate what the operation of the spring will be in its different positions on one side or the other of the axis of the hinge rod.

Screws as U are employed merely for the purpose of regulating the tension of the springs. They pass through clevises U' through which the anchoring of the springs is effected and being turned against some part immovable with respect to the hinge rods they will increase or decrease the effective length of the springs as will be readily understood. They may or may not be omitted. Of course each of the hinge rods is to be operated upon by a spring.

The complete apparatus above described will be found to answer all the purposes or objects of the invention previously enumerated.

Having now fully described my invention, what I claim as new herein, and desire to secure by Letters Patent, is—

1. As an improvement in the art of preparing bristles for brush making, the herein described method of treating them which comprises a preliminary slight moistening by the application of water at the time and as fast as they are moved, then subjecting them to the action of steam while being moved and then permitting them to fall freely through an open space, for the purposes set forth.

2. As an improvement in the art of preparing bristles for brush making, the herein described method of treating them, consisting in subjecting them to a preliminary slight chilling and moistening at the time and as fast as they are started to move, and as they continue to move in a partially separated condition, subjecting them to the action of a quiet current or volume of steam, by which they are further moistened, then delivering them thus moistened and separated over an open space and permitting them to fall therethrough without obstruction for the purposes set forth.

3. As an improvement in the art of preparing bristles for brush making, the herein described method of straightening and arranging them, that is to say, first effecting their separation one from the other and preventing electrification in or among them by the preliminary chilling by water and subsequent subjection to the action of steam as they are moved, then in this condition permitting them to fall freely through a suitable open space and to turn therein with their butt ends down and then collecting them at the end of their fall, substantially as and for the purposes explained.

4. In an apparatus of the character herein described the combination with the hopper for receiving the mass of bristles, of the straightener roll located in the lower part of the hopper and provided with a number of disks, substantially as and for the purposes set forth.

5. In an apparatus of the character herein described, the combination with the hopper for receiving the mass of bristles of the dampening roll located in the lower part of the hopper, and means substantially as explained for applying water to said roll, for the purposes set forth.

6. In an apparatus of the character herein described, the combination with the hopper for receiving the mass of bristles, of ejecting or projecting rolls located at the discharge end of the hopper, the same being arranged as explained to seize the bristles between them and to project the bristles forward, substantially in the manner and for the purposes set forth.

7. In an apparatus of the character herein described, the combination with the hopper for receiving the mass of bristles, the same being provided with ejecting or projecting rolls as explained, of an endless apron arranged to receive and carry the projected bristles, the apron being arranged to travel more rapidly than the said rolls, for the purposes set forth.

8. In an apparatus of the character herein described, the combination with an endless apron for carrying bristles distributed thereon, of a picker roll mounted over and projecting rolls mounted in advance of the delivery portion of said apron, said projecting rolls being arranged to receive the bristles from between the apron and picker roll and project them forward at the times and in the manner set forth.

9. In an apparatus of the character herein described, the combination with an endless apron for carrying bristles distributed thereon of the upper and lower projecting rolls mounted and moved as explained, one of said rolls being supplied with a spiral winding, substantially as shown and for the purposes set forth.

10. In an apparatus for arranging bristles, the combination with a traveling endless apron for carrying bristles distributed thereon, and the projecting rolls for casting the bristles forward of a second apron in advance of the first, the second one being made to travel at a greater rate of speed than the first, for the purposes and objects named.

11. In an apparatus for arranging bristles, a series of endless aprons confined with each other and with picker rolls and projecting rolls as explained and arranged to receive and carry the bristles distributed thereon, the rate of speed of the aprons being increased from the first one through the series in order to separate the bristles more and more as they are progressed, for the purposes set forth.

12. In an apparatus for arranging bristles, the combination with the endless apron extending over a chute into which the bristles are to be delivered, of the said chute and a deflecting apron traveling over the one first named and arranged to turn the bristles to a downward course, in the manner and for the purposes explained.

13. In an apparatus for arranging bristles, the combination with the endless apron extending over a chute into which the bristles are to be delivered, of a deflecting apron and projecting rolls, the latter being arranged to grasp the bristles and project them downwardly, substantially as shown and described.

14. In an apparatus of the character herein set forth, the combination with the inclined bottom plate of the chute, of the guard plate inclined toward the axis of the chute, the same being arranged to direct striking bristles upon the bottom plate and to prevent upward currents of air, the combination and arrangement being substantially as shown and described.

15. In an apparatus of the character herein set forth, the combination with the inclined bottom surface of the chute, of a second inclined surface to further turn the down coming bristles toward a horizontal direction, substantially as and for the purposes explained.

16. In an apparatus for arranging bristles, the combination with the chute through which they are allowed to fall, of the inclined bottom plate upon which they strike and projecting rolls arranged to receive the down coming bristles and cast them forcibly from the said bottom plate, substantially as and for the purposes explained.

17. In an apparatus for arranging bristles, the table for receiving the bristles projected from the chute, said table being composed of rolls revolving in pairs combined and arranged as explained to deliver the bristles down between the rolls of each pair, substantially as shown and described.

18. In an apparatus for arranging bristles, the combination with the receiving table composed of rolls and operating to deliver the bristles in the manner explained, of the endless traveling apron located under said table, substantially as shown and for the purposes set forth.

19. In an apparatus for arranging bristles, the combination with the endless apron located below the receiving table and carrying the straightened and arranged bristles therefrom, of a gripper placed in advance of said apron and arranged to grasp the bristles in rows or lines as they are presented to it and to carry them away from the apron, the construction being substantially as shown and described.

In testimony that I claim the foregoing I have hereunto set my hand in the presence of two witnesses.

ALFRED S. MILES.

Witnesses:
W. J. MORGAN,
WORTH OSGOOD.